United States Patent [19]
Koga et al.

[11] Patent Number: 5,214,239
[45] Date of Patent: May 25, 1993

[54] APPARATUS FOR FORMING AN ELECTROPHOTOGRAPHIC IMAGE HAVING A NOVEL TONER CARRIER

[75] Inventors: Yoshiro Koga; Masanao Kunugi; Mamoru Egi, all of Suwa, Japan

[73] Assignee: Seiko Epson Corporation, Tokyo, Japan

[21] Appl. No.: 854,291

[22] Filed: Mar. 19, 1992

[30] Foreign Application Priority Data

Mar. 22, 1991 [JP] Japan .................................. 3-59123
Jan. 29, 1992 [JP] Japan .................................. 4-14125

[51] Int. Cl.$^5$ ......................................... G03G 15/08
[52] U.S. Cl. ..................................... 118/653; 355/259
[58] Field of Search ............... 355/259, 245; 118/661, 118/692, 200, 204, 205, 261, 653, 651; 430/101

[56] References Cited

U.S. PATENT DOCUMENTS

| | | | |
|---|---|---|---|
| 4,268,943 | 5/1981 | Watanabe et al. | 118/651 X |
| 4,967,231 | 10/1990 | Hosoya et al. | 118/653 X |
| 5,057,871 | 10/1991 | Hirose et al. | 355/259 |
| 5,062,385 | 11/1991 | Nishio et al. | 118/653 |
| 5,076,201 | 12/1991 | Nishio et al. | 118/653 |
| 5,097,294 | 3/1992 | Nishio et al. | 355/245 |

FOREIGN PATENT DOCUMENTS

63-100482  5/1988  Japan .

Primary Examiner—R. L. Moses
Attorney, Agent, or Firm—Ladas & Parry

[57] ABSTRACT

A developing device having a toner carrier for feeding a toner through pressure contact with a latent image carrier on which an electrostatic latent image pattern has been formed. The toner carrier comprises a foam member having a foam portion and a solid surface layer portion. The foam portion and the solid surface layer portion comprise an identical material and are continuous with each other substantially without the presence of any interface therebetween. The foam member has a density gradient in the direction of the thickness. The developing device of the present invention enables a soft pressure contact development to be stably conducted, has advantageously low production and operation cost, and can form an image having a high resolution without a significant variation in the density.

10 Claims, 7 Drawing Sheets

APPARATUS FOR FORMING AN ELECTROPHOTOGRAPHIC IMAGE HAVING A NOVEL TONER CARRIER

BACKGROUND OF THE INVENTION

1. Field of the Invention

The present invention relates to an apparatus for forming an image through the use of an electrophotographic process. More particularly, the present invention is concerned with a developing device wherein a toner carrier is brought into pressure contact with a latent image carrier to develop an image.

2. Description of the Related Art

As disclosed in U.S. Pat. No. 3,731,146, a conventional developing device known in the art, in which a toner carrier is brought into pressure contact with a latent image carrier to develop an image, comprises a foam member as a backing material (a base material) and a soft electroconductive layer separately provided on the surface of the foam member to form a toner carrier. In this device, a toner is transported to the toner carrier and brought into pressure contact with a latent image carrier to develop an image.

In the above-described conventional toner carrier, however, in order to form an even electroconductive layer on the surface of a foam member as a base material, it is at least necessary to form an electroconductive layer so that the layer thickness is greater than the size of a cell of the foam member. However, it is not always easy to retain the flexibility of the foam member up to the surface of the toner carrier and exhibit the flexibility in that place. For this reason, a fluctuation in the environment or the like gives rise to a variation in the development pressure and developing nip width (contact width), so that there occur problems of a fluctuation in the density and a lowering in the resolution. Further, in the above-described toner carrier having a structure comprising two separate layers, that is, a base material and a surface layer, it is at least necessary to provide, in the manufacture thereof, a series of steps, i.e., at least a step of forming a foam member, a step of machining the foam member and a step of forming an electroconductive layer. Further, since the foam member is flexible, particularly the step of machining the foam member becomes complicated and inevitably requires a lot of time, which gives rise to an increase in the production cost of the toner carrier and in its turn an increase in the cost of the developing device.

SUMMARY OF THE INVENTION

The present invention solves the above-described problems of the prior art. An object of the present invention is to provide a developing device which enables a soft pressure contact development to be stably conducted through the use of a soft foam member. Another object of the present invention is to provide a developing device which provides a high resolution and is less liable to give rise to a fluctuation in the density of the image. A further object of the present invention is to provide a developing device provided with a toner carrier which is easy to manufacture and at low cost.

The developing device of the present invention has a toner carrier for feeding a toner through pressure contact with a latent image carrier on which an electrostatic latent image pattern has been formed, wherein said toner carrier comprises a foam member having a foam portion and a solid surface layer portion, said foam portion and said solid surface layer portion comprising an identical material and being continuous with each other substantially without the presence of any interface therebetween, said foam member having a density gradient in the direction of the thickness.

According to the above-described constitution of the present invention, the toner carrier comprises a foam member comprised of a foam portion and a solid surface layer portion made of the same material as that of the foam portion. The foam portion and the solid surface layer comprise an identical material and are continuous with each other substantially without any interface therebetween, and the foam member has a density gradient in the direction of the thickness. Thus, a toner carrier particularly having a high-density solid surface layer portion can be provided. This makes it possible to prepare a toner carrier which can eliminate the necessity of complicated post-machining and is inexpensive and, at the same time, enables a soft pressure contact development to be conducted through the utilization of the softness of the foam portion and the flexibility of the solid surface layer portion, so that it becomes possible to provide a developing device which is less liable to give rise to damage to a toner and has a high durability.

The above-described constitution can provide a developing device having a simple structure wherein use is made of a one-component non-magnetic toner.

The provision of an electroconductive layer on the solid surface layer portion enables a developing electrode to be made proximate to the latent image carrier, so that it becomes possible to form an image having a high resolution without a significant edge effect. Since an electroconductive layer is formed on the toner carrier, the toner can be held and transported by means of an electrostatic image force at the time of the transportation of the toner, so that it is possible to provide a developing device having a simple structure wherein use is made of particularly a one-component non-magnetic toner.

Further, when a magnetic field generating layer is provided on the solid surface layer portion, the toner is restrained on the toner carrier by magnetic force to stabilize the transportation of the toner, so that fogging (deposition of the toner on a non-image portion) can be inhibited by magnetic force.

Further, when the toner carrier is in a roller form and the solid surface layer portion is provided at least on the outer periphery of the foam member, it becomes possible to provide such an outer shape face that the polishing of an outer shape is unnecessary and functional layers, such as an electroconductive layer and a magnetic field generating layer, can be easily formed on the solid surface layer portion.

Further, when the solid surface layer portion is provided in a portion to be fixed to a shaft, the fixing strength between the shaft and the foam member can be improved.

Further, when the thickness of the solid surface layer portion is 2 mm or less, it becomes possible to obtain a flexibility sufficient for pressure contact development.

Further, when the foam member comprises a soft foam, an ample pressure contact width can be obtained under a low development pressure, which enables fluctuations in the pressure contact state at the pressure contact portion to be reduced, so that the development density can be stabilized. In particular, the use of foam materials, such as a polyurethane foam, a polystyrene foam, a polyethylene foam, an elastomer foam and a rubber foam, makes it possible to provide a developing device which has an ample softness, is inexpensive and has excellent mass productivity.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

5(a), 5(b), and 5(c) are schematic cross-sectional views of an embodiment of the developing device according to the present invention wherein an electroconductive layer is provided on the surface of a toner carrier.

DETAILED DESCRIPTION OF THE INVENTION

Figure 1:
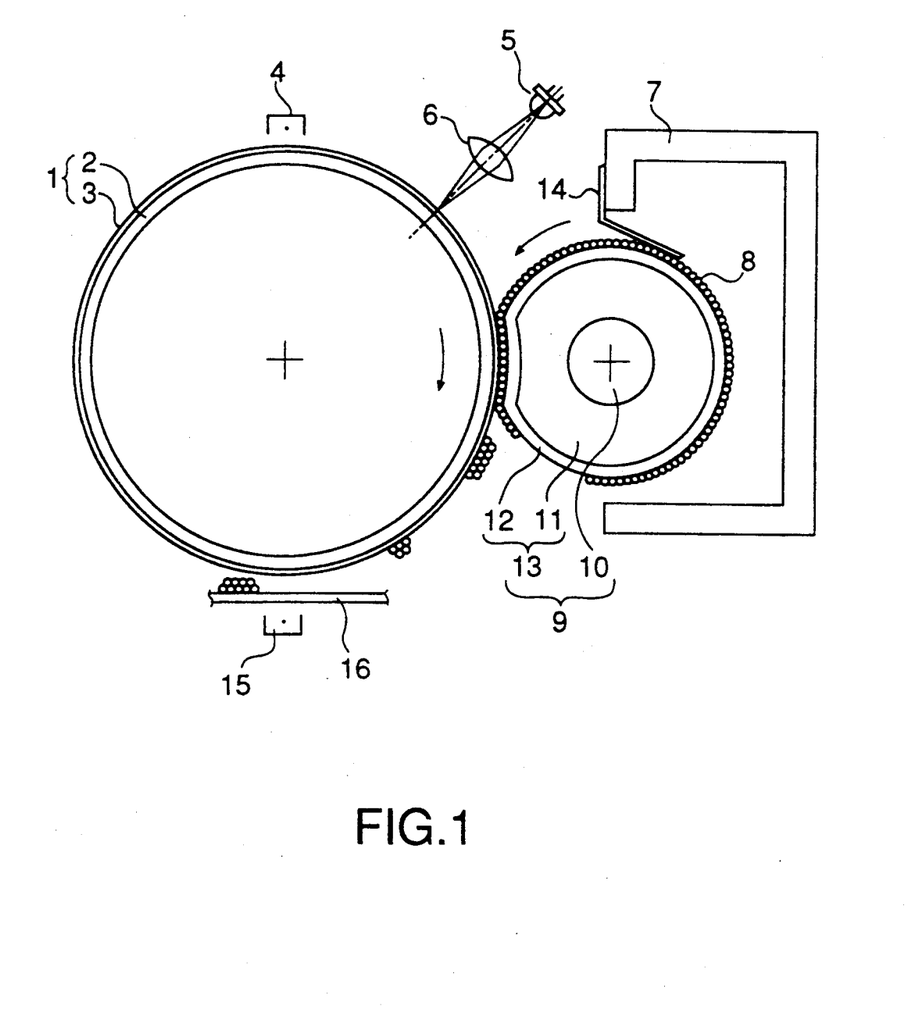
FIG. 1 is a schematic cross-sectional view of an image forming apparatus wherein use is made of an embodiment of the developing device according to the present invention.

FIG. 1 is a schematic cross-sectional view of an image forming apparatus wherein use is made of an embodiment of the developing device according to the present invention. A latent image carrier 1 comprises an electroconductive support 2 and, provided thereon, a photosensitive layer 3 comprising an organic or inorganic photoconductive material. The photosensitive layer 3 is electrified by an electrifier 4, such as a corona charger or an electrifying roller. Thereafter, light from a light source 5, such as laser or LED, is passed through an image forming optical system 6 and selectively applied to the photoconductive layer 3 corresponding to image information, thus causing a desired electrostatic latent image pattern to be formed by a potential contrast thus caused. In a developing device 7, a toner 8 as an image forming material is transported to develop an image. A toner carrier 9 for transporting the toner 8 comprises a shaft 10 and, provided on the outer periphery of the shaft 10, a foam member 13 having a foam portion 11 and a solid surface layer portion 12 which comprise an identical material and is continuous with each other. A blade 14 comprising a nonmagnetic or magnetic metal is pressed against the toner carrier 9 to electrify the toner 8 to a specific polarity and, at the same time, to regulate the toner layer to a suitable thin layer. The toner 8 is held directly on the toner carrier 9, and the toner carrier 9 is rotated to transport the toner 8 in a thin layer form. The toner carrier 9 is in contact with the latent image carrier 1 under a specific pressure. In the pressure contact portion or in the vicinity of the pressure contact portion, a developing electric field is formed by a potential contrast of the latent image carrier 1 and a developing bias voltage applied between the latent image carrier 1 and the toner carrier 9 or between the latent image carrier 1 and the blade 14, and the electrified toner 8 is subjected to a development depending upon the developing electric field. Thus, the electrostatic latent image pattern of the latent image carrier 1 is visualized by means of the electrified toner 8. Further, the toner image is transferred onto a recording paper 16 through the use of a transfer device 15, such as a corona transfer device or a transfer roller, and fixed on the recording paper 16 by heat or pressure to obtain a desired image on the recording paper 16.

Figure 2:
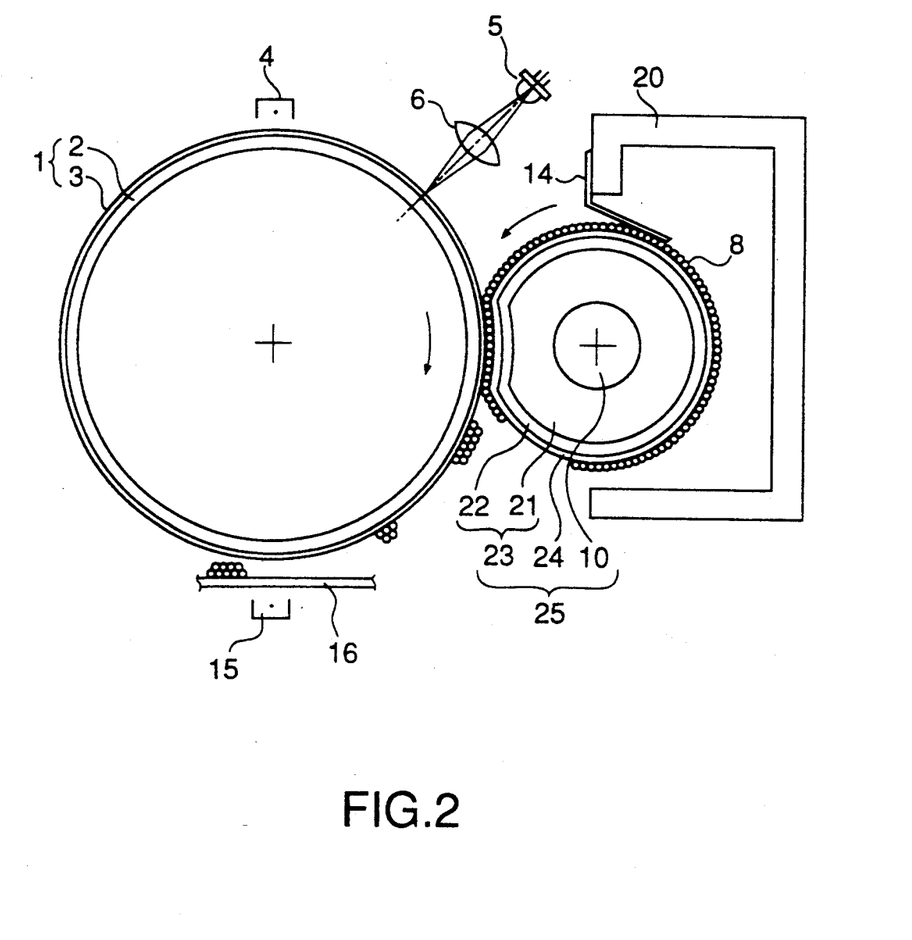
FIG. 2 is a schematic cross-sectional view of an image forming apparatus wherein use is made of another embodiment of the developing device according to the present invention.

FIG. 2 is a schematic cross-sectional view of an image forming apparatus wherein use is made of another embodiment of the developing device according to the present invention. In this figure, those parts which are the same or have substantially the same functions as corresponding parts in FIG. 1 are designated by the same reference numerals. A developing device 20 serves to transport a non-magnetic toner 8 to conduct a development. A foam member 23 having a foam portion 21 and a solid surface layer portion 22 which comprise an identical material and are continuous with each other are provided on the outer periphery of the shaft 10. An electroconductive layer 24 is provided on the solid surface layer portion 22 of the foam member 23. A toner carrier 35 comprises the shaft 10, the foam member 23 and the electroconductive layer 24. The toner carrier 25 is in contact with the latent image carrier 1 under a specific pressure. In the pressure contact portion or in the vicinity of the pressure contact portion, a developing electric field is formed by a potential contrast of the latent image carrier 1 and a developing bias voltage applied between the latent image carrier 1 and the electroconductive layer 24 of the toner carrier 25 or between the latent image carrier 1 and the blade 14, and the electrified toner 8 is subjected to a development depending upon the developing electric field. Thus, the electrostatic latent image pattern of the latent image carrier 1 can be visualized by means of the electrified toner 8.

Figure 3:
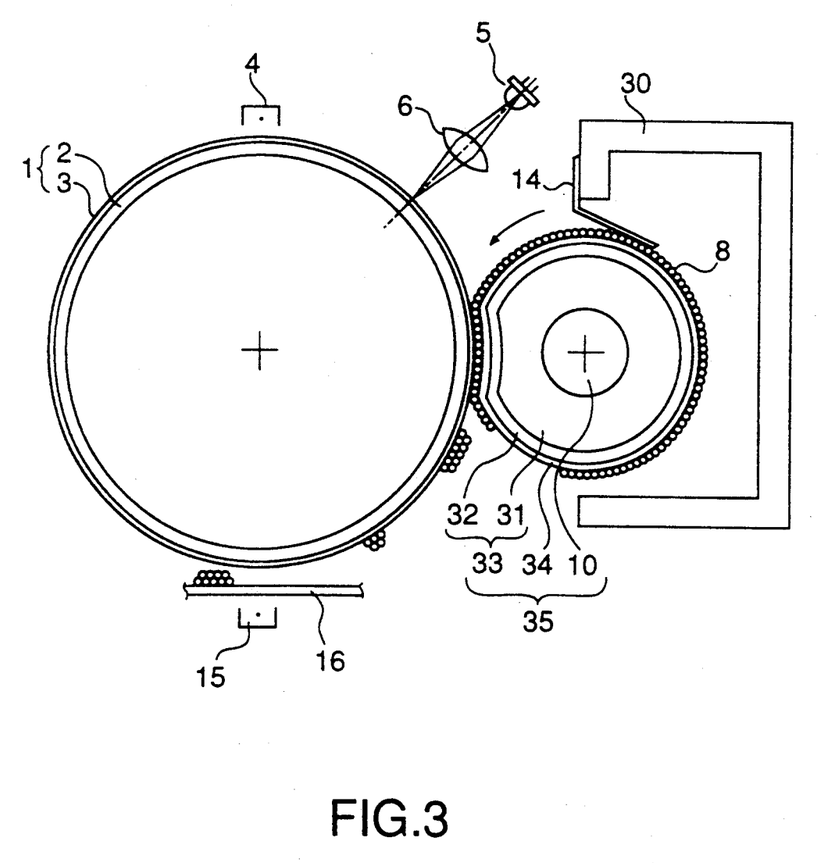
FIG. 3 is a schematic cross-sectional view of an image forming apparatus wherein use is made of a further embodiment of the developing device according to the present invention.

FIG. 3 is a schematic cross-sectional view of an image forming apparatus wherein use is made of a further embodiment of the developing device according to the present invention. In this drawing, the same reference numerals designate parts which are the same or have substantially the same functions as corresponding parts in FIGS. 1 and 2. A developing device 30 serves to transport a non-magnetic toner 8 to conduct a development. A foam member 33 having a foam portion 31 and a solid surface layer portion 32 which comprise an identical material and are continuous with each other are provided on the outer periphery of the shaft 10, and a magnetic field generating layer 34 is provided on the solid surface layer portion 32 of the foam member 33. A toner carrier 35 comprises the shaft 10, the foam member 33 and the magnetic field generating layer 34. The above-described constitution wherein the toner carrier 35 has a magnetic field generating layer 34 enables the magnetic toner 8 to be directly held on the toner carrier 35 and transferred by magnetic force onto the surface of the magnetic field generating layer 34 through the use of a leakage magnetic field. The toner carrier 35 is in contact with the latent image carrier 1 under a specific pressure. In the pressure contact portion or in the vicinity of the pressure contact portion, a developing electric field is formed by a potential contrast of the latent image carrier 1 and a developing bias voltage applied between the latent image carrier 1 and the toner carrier 35 or between the latent image carrier 1 and the blade 14. The electrified magnetic toner 8 is subjected to a development depending upon the developing electric field. Thus, the electrostatic latent image pattern of the latent image carrier 1 is visualized by means of the electrified magnetic toner 8.

In FIGS. 1 to 3, the photosensitive layer 3 of the latent image carrier 1 may comprise an organic or inorganic photosensitive material. The shaft 10 may comprise a metallic material, such as steel or aluminum, a resin material or the like. The blade 14 may comprise a metallic plate or a thin metallic sheet or a resin or a resin film having a shape of a doctor knife at its tip. In order to reduce the thickness of the toner layer on the toner carrier, the blade 14 is preferably formed in such a manner that it is pressed against the toner carrier. Further, the toner 8 may comprise any known toner irrespective of whether or not it possesses magnetism and may be either a resin toner or a wax toner. The developing agent is not limited to a one-component type.

The foam member for constituting the toner carrier will now be described.

Figure 4:
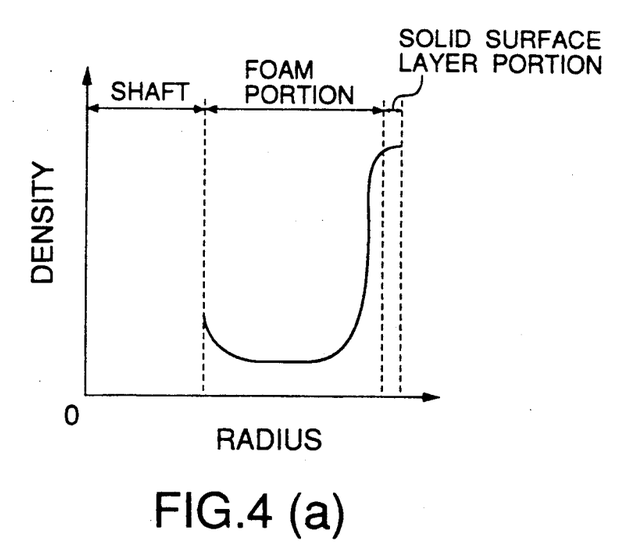
FIGS. 4(a) and 4(b) are graphical diagrams showing density distributions of a foam member of the developing device according to the present invention.

FIG. 4 comprises two graphical diagrams showing examples of density distribution of foam members of the developing device according to the present invention. FIG. 4(a) is a diagram showing the density distribution of a foam member according to an embodiment of the present invention, a foam portion is fixed to a shaft by means of vulcanization bonding or the like. The foam portion has foamed cells continuous with one another and ample softness. In the vicinity of the outer periphery, the density distribution increases describing a parabola in the radial direction, and a high-density solid surface layer portion comprising the same material as that of the foam portion and having substantially no foamed cell (vacancy) is formed on the outer periphery. Such a solid surface layer portion can be formed by a method such as a reaction injection molding method wherein a stock solution of a foaming material is injected into a die for a reaction. The solid surface layer portion is formed to have a thickness of 2 mm or less, preferably of the order of a number of hundreds μm. Thus, it is possible to form a toner carrier having ample flexibility and a smooth surface without detriment to the softness of the foam portion. The ratio of the thickness of the solid surface layer portion to the thickness of the foam portion is preferably in the range of from 0.02 to 0.5, still preferably in the range of from 0.03 to 0.2. In this ratio, the pressure contact development can be further stabilized. When the above ratio exceeds 0.5, the hardness of the surface layer portion increases, so that the flexibility becomes insufficient. On the other hand, when the above ratio is less than 0.02, pin holes are unfavorably liable to occur on the surface of the surface layer portion.

FIG. 4(b) is a diagram showing the density distribution of a foam member according to another embodiment of the present invention. A foam member is formed on a shaft by means of vulcanization bonding or the like or by monolithic molding together with the shaft. The foam portion has foamed cells continuous with one another and ample softness. In the vicinity of the outer periphery, the density increases substantially describing a parabola, and a high-density solid surface layer portion comprising the same material as that of the foam portion and having substantially no foamed cell (vacancy) is formed on the outer periphery. As with the embodiment shown in FIG. 4(a), the solid surface layer portion can be formed by a reaction injection molding method or the like. The solid surface layer portion can be formed also on the shaft portion to improve the fixing strength. Further, the shaft can be inserted into a die to carry out monolithic molding, which makes it possible to form a toner carrier in a small number of steps of working with high mechanical precision.

Although the foam portion may be in the form of either a closed cell or an interconnected cell, since the closed cell gives rise to a change in the dimension with temperature, the interconnected cell is preferred. When the thicknesses of the foam portion and the solid surface layer are of the order of 2 to 10 mm and a number of hundreds μm, respectively, the toner carrier can be pressed against the latent image carrier by a very low pressure of 1 to 5 g/mm in terms of the linear pressure unattainable by conventional rubber, so that the pressure contact development can be conducted while maintaining a stable pressure contact state without any damage to the toner. A soft foam material is favorable as the foam member, and examples thereof include a polyurethane foam, a polystyrene foam, a polyethylene foam, an elastomer foam and a rubber foam. In particular, the polyurethane foam has excellent moldability and a high hydrophilic property, which renders the polyurethane foam suitable for forming an electroconductive layer and a magnetic field generating layer on the solid surface layer portion. Further, the foam member can be produced by, besides the reaction injection molding method, a gas inclusion method, a foaming agent decomposition method, a solvent volatilization method, a chemical reaction method, a sintering method, an elution method, etc. The formation of the solid surface layer portion by any of the above methods affords high dimensional accuracy to be attained without post-working, so that a toner carrier having a light weight can be produced at low cost.

The formation of functional layers, such as an electroconductive layer and a magnetic layer, on the solid surface layer portion as shown in FIGS. 2 and 3 provides a functional roller having a high softness. Embodiments of the layer structure of the toner carrier will now be described.

Figure 5:
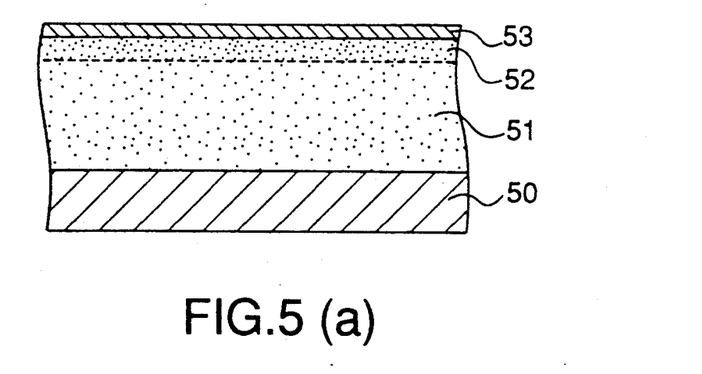

FIG. 5(a) is a schematic cross-sectional view of an embodiment of the developing device according to the present invention wherein a conductive layer is formed on the surface of a toner carrier. A foam portion 51 and a solid surface layer portion 52 are formed in that order on a base 50, such as a shaft, and an electroconductive layer 53 is formed on the solid surface layer portion. The provision of a conductive layer 53 on the outer periphery portion of the toner carrier in this way makes possible the attainment of a sufficient developing electrode effect by applying a developing bias voltage to the conductive layer 53 through a thin toner layer at the time of the pressure contact development to make the developing electrode proximate to the latent image carrier, so that it becomes possible to form an image having a high resolution and an excellent area gradation without a significant edge effect (which is a state wherein a strong electric field occurs at the edge portion of the image and excess toner is subjected to a development). With respect to the resistance of the electroconductive layer 53, a stable developing current can be obtained when the resistance between the surface of the electroconductive layer 53 and the developing bias voltage application portion is 100 MΩ or less. The thickness of the electroconductive layer 53 is preferably 100 μm or less from the viewpoint of ensuring sufficient flexibility. With respect to the material for the electroconductive layer 53, the dispersion of an electroconductive fine powder, such as carbon black or a metal, in substantially the same resin as that in the foam portion 51 can contribute to an improvement in the bonding strength between the solid surface layer portion 52 and the electroconductive layer 53. An even layer can be formed as the conductive layer 53 through the use of spray coating, transfer coating, in-mold coating, roller coating, electroless plating or the like.

FIG. 5(b) is a schematic cross-sectional view of another embodiment of the developing device according to the present invention wherein a conductive layer is provided on the surface of a toner carrier. A solid surface layer portion 52, a foam portion 51 and another solid surface layer portion 52 are provided in that order on a base 50, such as a shaft, and an electroconductive layer 53 is provided on the another solid surface layer portion 52. By the provision of an electroconductive layer 53 on the outer periphery portion of the toner carrier in this way, ample developing electrode effect can be attained. The bonding strength between the shaft 50 and the foam member can be improved by the provision of the solid surface layer portion 52 between the shaft 50 and the foam portion 51, and the number of steps of working can be reduced through monolithic molding of the shaft 50 and the foam member. The solid surface layer portion 52 can be provided not only on the upper and lower sides of the foam portion 51 but also on the end of the foam portion 51 or the like. By the above described construction, the inclusion of toner in the foam portion 51 can be prevented.

FIG. 5(c) is a schematic cross-sectional view of a further embodiment of the developing device according to the present invention wherein a conductive layer is provided on the surface of a toner carrier. A solid surface layer portion 52, a foam portion 51 and another solid surface layer portion 52 are formed in that order on a base 50, such as a shaft. An electroconductive layer 53 is provided on the another solid surface layer portion 52, and a protective layer 54 is provided on the electroconductive layer 53. The provision of a protective layer 54 on the electroconductive layer 53 in this way contributes to an improvement in the durability of the electroconductive layer 53 and, at the same time, makes possible control of the polarity of electrification and the amount of electrification through the inclusion of a charge control agent in the protective layer 54. The thickness of the protective layer 54 is preferably 100 μm or less, more preferably of the order of several μm from the viewpoint of ensuring ample flexibility. With respect to the material for the protective layer 54, a resin having excellent abrasion resistance, such as a fluororesin, is used in the case where an improvement in the durability is intended, while a dye, a pigment or the like can be used in the case where the electrification of the toner is controlled.

Figure 6:
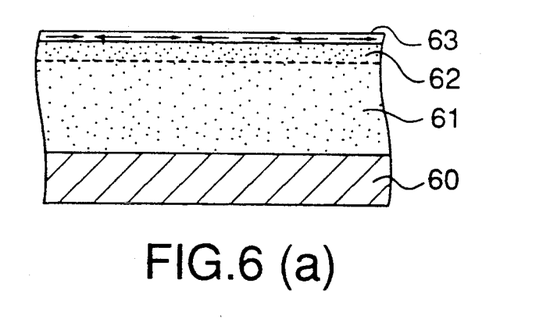
FIGS. 6(a), 6(b), 6(c), and 6(d) are schematic cross-sectional views of another embodiment of the developing device according to the present invention wherein a magnetic field generating layer is provided on the surface of a toner carrier.

FIG. 6(a) is a schematic cross-sectional view of an embodiment of the developing device according to the present invention wherein a magnetic field generating layer is provided on the surface of a toner carrier. In this embodiment, a foam portion 61 and a solid surface layer portion 62 are provided in that order on a base 60, such as a shaft, and a magnetic field generating layer 63 is provided on the solid surface layer portion 62. When the magnetic field generating layer 63 is provided on the outer periphery of the toner carrier in this manner, the magnetic toner can be held on the toner carrier by means of magnetic force and stably transported, so that the scattering of the toner can be prevented. Further, at the time of the development, the occurrence of fogging can be reduced through the generation of the development inhibitory force by the magnetic force against the developing force by the developing electric field. Further, it is also possible to attain a development electrode effect by making the magnetic field generating layer 63 electroconductive. The thickness of the magnetic field generating layer 63 is preferably 100 μm or less from the viewpoint of ensuring ample flexibility. With respect to the material for the magnetic field generating layer 63, the dispersion of a ferromagnetic fine powder in substantially the same resin as that in the foam portion 61 contributes to an improvement in the bonding strength between the solid surface layer portion 62 and the magnetic field generating layer 63. An even layer can be formed as the magnetic field generating layer 63 through the use of spray coating, transfer coating, in-mold coating, roller coating, electroless plating or the like. The ferromagnetic material for the magnetic field generating layer 63 may be any material known as a magnetic recording material and a magnetic material. Specific examples thereof include a magnetic material containing at least one element selected from Fe, Ni, Co, Mn and Cr, for example, $\gamma$-$Fe_2O_3$, Ba-Fe, Ni-Co, Co-Cr and Mn-Al. The demagnetization of the magnetic field generating layer 63 caused by a magnetic toner and a magnetically soft component around the developing device can be prevented by applying a coercive force of 2000 Oe or more.

FIG. 6(b) is a schematic cross-sectional view of another embodiment of the developing device according to the present invention wherein a magnetic field generating layer is provided on the surface of a toner carrier. In this embodiment, a solid surface layer portion 62, a foam portion 61 and another solid surface layer portion 62 are provided in that order on a base 60, such as a shaft, and a magnetic field generating layer 63 is provided on the solid surface layer portion 62. When the magnetic field generating layer 63 is provided on the outer periphery of the toner carrier in this manner, the magnetic toner can be held on the toner carrier by means of magnetic force and stably transported, which prevents scattering of the toner, so that the occurrence of fogging can be reduced. The bonding strength between the shaft 60 and the foam member can be improved by the provision of the solid surface layer portion 62 between the shaft 60 and the foam portion 61, and the number of steps of working can be reduced through monolithic molding of the shaft 60 and the foam member. The solid surface layer portion 62 can be formed not only on the upper and lower sides of the foam portion 61 but also on the end of the foam portion 61 or the like. By the above-described construction, the inclusion of toner in the foam portion 61 can be prevented.

FIG. 6(c) is a schematic cross-sectional view of a further embodiment of the developing device according to the present invention wherein a magnetic field generating layer is provided on the surface of a toner carrier. In this embodiment, a solid surface layer portion 62, a foam portion 61 and another solid surface layer portion 62 are provided in that order on a base 60, such as a shaft. An electroconductive layer 64 is provided on the solid surface layer portion 62, and a magnetic field generating layer 63 is provided on the electroconductive layer 64. The provision of an electroconductive layer 64 and a magnetic field generating layer 63 on the solid surface layer portion 62 in this manner produces ample developing electrode effect, so that it becomes possible to form an image having a high resolution and an excellent area gradation. Further, since ample toner holding power can be obtained, it is possible to form an image having no significant fogging and a high contrast. The thickness of the electroconductive layer 64 is preferably 100 μm or less from the viewpoint of ensuring ample flexibility.

FIG. 6(d) is a schematic cross-sectional view of a further embodiment of the developing device according to the present invention wherein a magnetic field generating layer is provided on the surface of a toner carrier. In this embodiment, a solid surface layer portion 62, a foam portion 61 and another solid surface layer portion 62 are provided in that order on a base 60, such as a shaft. A magnetic field generating layer 63 is provided on the solid surface layer portion 62, and a protective layer 65 is provided on the magnetic field generating layer 63. The provision of a protective layer 65 on the magnetic field generating layer 63 in this way contributes to an improvement in the durability of the magnetic generating layer 63 and, at the same time, makes possible control of the polarity of electrification and the amount of electrification through the inclusion of a charge control agent in the protective layer 65. The thickness of the protective layer 54 is preferably 100 μm or less, still preferably of the order of several μm from the viewpoint of ensuring sufficient flexibility. With respect to the material for the protective layer 54, a resin having an excellent abrasion resistance, such as a fluororesin, is used in the case where an improvement in the durability is intended, while a dye, a pigment or the like can be used in the case where the electrification of the toner is controlled.

Preferred examples of the method of forming a toner carrier having an electroconductive layer on a solid surface layer portion according to the above-described embodiments will be further described below.

At the outset, an electroconductive hollow cylindrical member is previously fabricated. A foam member having a foam portion and a solid surface layer portion is formed within the cylindrical member to form a toner carrier. Examples of the hollow cylindrical member used in this case include a thin-walled cylindrical tube of a metal, for example, a Ni tube fabricated by electroforming and an Al tube or a Cu tube fabricated by extrusion. Separately, an electroconductive resin tube is previously fabricated, and a toner carrier is formed by the same method as that described above. In the resin tube in this case, use may be made of any resin provided that it is flexible and moldable into a tube. Examples thereof include dispersions of electroconductive powders, such as carbon black, in materials such as urethane, polyesters, nylon, fluororesins, polyethylene, polypropylene, vinyl chloride, silicone, acrylic rubber, chloroprene rubber, nitrile rubber, styrene-butadiene rubber, polybutadiene and polyisoprene. Further, it is also possible to use a resin tube wherein an electroconductive material is vapor-deposited or coated on the surface of the tube. Further, the tube may be composed of a material comprising an electroconductive resin composition besides the dispersion of a conductive agent in a resin. The tube can be prepared by a known method such as extrusion or rapping. Further, it is also possible to use a thermal shrinkage tube comprising these materials. Other examples of the method of forming an electroconductive layer include a method wherein an Al, Cr or An metal is directly vapor-deposited on the solid surface layer portion.

When the electroconductive layer is formed on the solid surface layer portion, some materials for the foaming agent cause an additive to bleed from the lower layer, so that contamination or breaking of the photoreceptor or filming of the toner is liable to occur. In this case, it is also possible to provide an intermediate layer, i.e., a bleeding preventive layer, between the solid surface layer portion and the electroconductive layer.

Favorable features which the toner carrier according to the present invention has will now be described.

The roughness of the toner carrier surface (the surface of the electroconductive layer or protective layer if it is provided) is preferably 20 μmRz or less, more preferably 10 μmRz or less.

In order to stably conduct a soft pressure contact development, the hardness of the toner carrier is preferably 10° to 70°, more preferably 20° to 35° in terms of Asker C hardness. Asker C hardness is the broadly used Japanese standard for hardness according to the regulation of a rubber hardness meter manufactured by KOBUNSHI KEIKI K.K., Japan.

Since the toner carrier comprising a foam member is an elastomer, the occurrence of a permanent strain in the toner carrier gives rise to a fluctuation in the nip between the photoreceptor and the toner carrier, a fluctuation in the pushing pressure, etc. which becomes causative of a remarkable deterioration in the image. The permanent compression strain (as determined according to JIS-K-6301) of the toner carrier is preferably 20% or less for the purpose of reducing the above-described drawbacks. Further, when the permanent compression strain is 5% or less, the deformation derived from the pressure contact of components with each other can be substantially eliminated.

The magnetic field generation layer will now be described in more detail.

In a preferred embodiment of the present invention, the magnetic field generating layer comprises a heat shrinkage sleeve comprising a magnetic powder dispersed in a binder. Examples of the binder usable in this case include heat-shrinkable materials such as polyurethane, polyvinyl chloride, polyethylene, polypropylene, straight-chain polyesters, polyamide resins, crystalline polyolefins, crosslinked polyolefins, non-crosslinked polyolefins, crystalline polyolefin copolymers, fluororesins, silicone rubber and EPDM. Other examples of the binder include, besides the polyurethane resin, vinyl copolymer resins such as vinyl chloride, fluororesins, polyethylene, polypropylene, polyesters, polyamide resins, polyolefins, epoxy resins, vinyl acetate, vinyl alcohol, vinyl butyral, vinyl formal and vinyl ethyl ester, nitrocellulose, cellulose acetobutyrate, and blends thereof with other resins. Further, all of other elastic or flexible materials, for examples, rubber materials, such as EPDM, fluororubber, silicone rubber, chloroprene rubber, natural rubber, isoprene rubber, butadiene rubber, neoprene rubber and NBR, may be used as the binder.

The magnetic powder dispersed in the binder may be any magnetic powder known as a magnetic recording material or a magnet material. Specific examples thereof include magnetic materials containing at least one element selected from Fe, Ni, Co, Mn and Cr, for example, $\gamma$-$Fe_2O_3$, $BaO$-$6Fe_2O_3$, Co-$\gamma$-$FeO_3$, Ba-Fe, Ni-Co, Co-Cr and Mn-Al.

Besides the magnetic powder, electroconductive powders such as a magnetic powder, a metallic whisker and carbon black may be incorporated in the binder. In this case, the carbon black preferably has a capability of forming a strong structure and serves to remarkably lower the electrical resistance with an increase in the amount of addition of the carbon black. Specific examples of the carbon black usable in this case include ketjenblack, acetylene black, lamp black and high structure furnace black. Acetylene black or other carbon black having an excellent electric conductivity is particularly favorable. Since the surface area per unit amount of addition of the carbon black increases with a reduction in the particle diameter, a carbon black having a small particle diameter is preferred for the purpose of lowering the electric conductivity.

The method of forming the above-described sleeve magnetic field generating layer will now be described.

The sleeve magnetic field generating layer can be formed by molding such as extruding, injection molding, blow molding, vacuum molding, compression molding, transfer molding and centrifugal molding. Among them, the centrifugal molding wherein a molten resin is injected into the inner surface of a cylindrical mold being rotated at a high speed and molded is particularly suitable when the surface of the sleeve is finished to a specular state. Further, according to the extruding, since a seamless sleeve having an even thickness can be continuously produced, the production cost can be reduced. When the surface roughness, Rz, of the extrusion mold is in the range of from 0.05 to 5 $\mu$m, since a desired surface roughness can be given to the surface of the sleeve, this is particularly desired for the production of an inexpensive developing carrier.

In the formation of the sleeve magnetic field generating layer, it is advantageous to use a roller covered with a heat-shrinkable sleeve. For example, after a foam member is inserted into the sleeve before the heat shrinkage, the environment is evacuated and heated (to 120° C.) to shrink the sleeve to cover the outer periphery of the foam member. Thus, when a heat-shrinkable sleeve is shrunken after the environment is evacuated, it is possible to eliminate the problem of air staying between the foam member and the sleeve and a protruded portion occurring on the surface of the sleeve.

Further, according to this method, since the heat-shrinkable sleeve is caused to adhere to the foam member by the holding power of the heat-shrinkable sleeve, it becomes unnecessary to fix the heat-shrinkable sleeve to the foam member by means of an adhesive. Further, even when the foam member and the heat-shrinkable sleeve are subjected to a bonding treatment, since the surface of the foam member is covered with a relatively high-density solid surface layer portion, there is no possibility of the adhesive being impregnated into the cell of the foam portion to excessively raise the hardness of the foam member.

On the other hand, when the outer periphery of a coarse cell foam is directly covered with a heat-shrinkable sleeve, since the heat-shrinkable sleeve shrinks while tracing the inequality in the cell of the foam portion, the developing agent carrier obtained is one having a very rough surface. On the other hand, in the above-described method, since the solid surface layer portion can be made very smooth by covering the foam member having a solid surface portion on the outer periphery of the foam with the heat-shrinkable sleeve, the developing agent carrier has a very smooth surface also after covering with the heat-shrinkable sleeve. When very small through holes scatter on the solid surface layer portion, even though the step of evacuating the environment is omitted, there is no possibility of air remaining between the heat-shrinkable sleeve and the solid surface layer portion.

In this method, after a foam member is inserted into the interior of the heat-shrinkable sleeve, heating is successively conducted from one end of the heat-shrinkable sleeve by heating means such as an electric furnace or a drier to cover the sleeve with the outer periphery of the foam member. In this method as well, since the covering of the foam member is successively conducted from the end of the sleeve, it is possible to prepare a developing agent carrier having a smooth surface without causing air to remain. Further, since the covering with the sleeve can be conducted without evacuation of the environment, the size of the covering device can be reduced. Further, since the covering time can be shortened, the above method is suitable particularly for mass production.

In the above described heat shrinking method, for example, after a foam member is inserted into the inside of the heat-shrinkable sleeve, the heat-shrinkable sleeve can be successively immersed into a hot water bath of about 90° C. to conduct shrink covering.

The toner carrier can be produced by, besides the above-described method wherein a heat-shrinkable sleeve is caused to adhere to the outer periphery of the foam member, a method wherein a sleeve having a magnetic powder, an electroconductive powder or other powder dispersed therein is inserted together with a shaft into a mold and monolithic molding is conducted by reaction injection molding or the like. This monolithic molding makes possible production of a toner carrier in a small number of manufacturing steps with high mechanical precision.

The method of magnetizing the toner carrier will now be described.

There is no particular limitation on the magnetization method, which can be conducted by in-plane magnetization or vertical magnetization.

In the in-plane magnetization, the toner carrier is rotated with a magnetic head abutted against the magnetic field generating layer and, at the same time, the magnetic head is scanned towards the axial direction of the toner carrier to conduct the magnetization. In this method, the magnetization is spirally conducted with a small pitch in the circumferential direction of the toner carrier. In the toner carrier according to the present invention, since the magnetic field generating layer is formed on the foam member having elasticity, even when the magnetic head is strongly abutted against the magnetic field generating layer, the abutting pressure of the head is dispersed and relaxed, so that damage to the magnetic field generating layer can be minimized and the head gap portion is caused to adhere closely to the magnetic field generating layer. This prevents gap loss during the magnetization.

Examples of the vertical magnetization include magnetic copying wherein use is made of a master magnet having a leakage magnetic flux density of 2000 Gs on its surface. The master magnet in this case may be a cylindrical Nd-Fe-B-base rare earth magnet having a thickness of 1 mm. In this magnet, the magnetization can be conducted with a 1-mm pitch so that the leakage magnetic flux density of the magnet on its surface is 2000 Gs.

In the above-described embodiment, the magnetic field generating layer can be formed by providing, on a foam member, a 200 $\mu$m-thick material comprising a dispersion of a $\gamma$-Fe$_2$O$_3$-base magnetic powder and carbon black in a urethane binder. The magnetization of the magnetic field generating layer is conducted, for example, by magnetic copying wherein the magnetic field generating layer and the master magnet are rotated at the same peripheral velocity while they are abutted against each other in such a manner that the contact width between the magnetic field generating layer and the master magnet is about 3 mm. Since the magnetic field generating layer is formed on the foam member, the toner carrier comes into contact even with a very hard master magnet while causing the toner carrier to be elastically deformed without leaving a gap, so that the magnetization can be evenly conducted at any position of the toner carrier.

When a sleeve having a magnetic powder dispersed thereon is used as a magnetic field generating layer, after the vertical magnetization is previously conducted on the sleeve, a foam member can be covered with the magnetized sleeve or subjected to monolithic molding together with the magnetized sleeve.

With respect to the thickness of the magnetic field generating layer, according to the results of studies we have conducted, it is apparent that the magnetic restraint increases with an increase in the thickness of the magnetic coating. In particular, a good magnetic restraint can be obtained when the thickness of the magnetic coating is 20 $\mu$m or more, preferably 40 $\mu$m or more.

With respect to the coercive force of the magnetic field generating layer, the larger the coercive force of the magnetic coating, the stronger is the magnetic restraint. When the coercive force is 200 Oe or more, the magnetic restraint can be stably maintained without attenuation. Further, when the coercive force is 2,000 Oe or more, a magnetic restraint corresponding to a development bias of about 100 V is obtained, so that the occurrence of fogging derived from the toner having an opposite polarity can be prevented.

Further, since the toner is held and transported by means of magnetic force, no lowering in the density derived from the insufficiency of the amount of feed of the toner is observed when printing is conducted at a high speed of 30 PPM or more. Further, even when the toner feed roller is removed, an ample amount of toner can be fed by means of magnetic force alone. In this respect as well, the device can be produced at a low cost. Further, the toner feeding performance can be stabilized independently of the residual amount of the toner within a hopper.

In order to develop the above described magnetic restraint, it is preferred that 0 to 60% by weight, preferably 30% by weight of a magnetic powder be incorporated in the toner.

The smaller the thickness of the sleeve having a magnetic powder dispersed thereon, the better is the flexibility. According to our findings, a flexibility usable in the development can be obtained when the thickness is 700 $\mu$m or less, and a particularly good flexibility can be obtained when the thickness is 300 $\mu$m or less.

The surface roughness (Rz) and the coefficient of dynamic friction of the magnetic field generating layer is preferably in the range of from 0.1 to 5 $\mu$m and in the range of from 0.2 to 0.7, respectively.

The abrasion resistance of the magnetic field generating layer will now be described.

Figure 7:
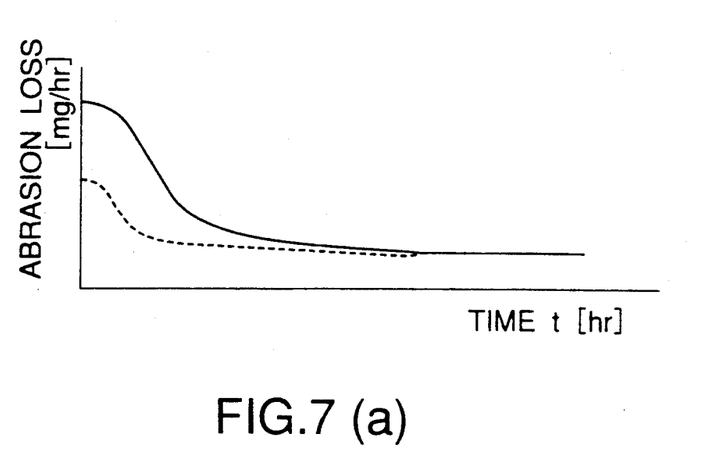
FIGS. 7(a) and 7(b) are graphs indicating mechanical properties of a magnetic field generating layer provided on a toner carrier in the developing device according to the present invention.

FIG. 7(a) shows a change of the abrasion loss of a sleeve magnetic field generating layer comprising an acrylic resin as a binder with the elapse of time, and FIG. 7(b) shows a relationship between the abrasion loss and the surface roughness (Rz) with respect to the surface of a sleeve. Since the surface of the sleeve is always fretted through toner particles at a position facing the elastic blade and the electrostatic latent image carrier, as shown in FIG. 7(a), the surface of the sleeve was abraded with the elapse of time. Consequently, as shown in FIG. 7(b), the surface roughness (Rz) rapidly decreased with an increase in the abrasion loss. In particular, since the abrasion loss of the sleeve immediately after the initiation of use of the toner carrier is large, the variation of the amount of transportation of the toner at an initial stage became large.

Therefore, when a sleeve having a low abrasion resistance is provided on the surface of the toner carrier, although the amount of transportation and the amount of electrification of the toner are favorable at an initial stage for the development, the surface of the sleeve is unfavorably abraded during sliding of the toner on the surface of the sleeve, so that an image having an insufficient density is unfavorably formed when the surface roughness of the sleeve and the coefficient of friction are not favorable for the transportation and electrification of the toner. Further, when a flaw or the like occurs in the sleeve, since the amount of transportation of the toner becomes heterogeneous, there occurs a severely fogged image or an image having a lowered fine line reproducibility.

We have made further studies based on the above described findings and, as a result, have found that when the material for the sleeve covering the elastic layer exhibits an abrasion loss of 700 mg or less as determined by an abrasion test (abrasion wheel H22, rolling abrasion in 1,000 revolutions) specified in JIS-K7311, it is possible to prepare a toner carrier wherein the surface of the sleeve is not easily abraded when it is subjected to severe rubbing and friction by the developing agent, and the surface roughness remains constant over a long period of time, so that an image having ample image density and a good resolution can be stably formed. Further, when the material for the sleeve exhibits an abrasion loss of 200 mg or less as determined by the above described abrasion test, the abrasion of the sleeve at an initial stage can be remarkably reduced. Therefore, it became possible to form an image with little fluctuation in the density from the initiation of use of the toner carrier over a long period of time.

The formation of a magnetic field generating layer in the above described manner increases the Asker C hardness by 2° or more, preferably 5° or more, by which a layer having a high hardness can be formed on the surface thereon. It is possible to attain the effect of preventing stick slipping in the blade portion and the development portion through curing of the surface in the above described hardness range.

In the present invention, it is also possible to provide a bleedout preventive effect between the foam member and the magnetic field generating layer. The bleedout preventive layer, which serves to prevent the occurrence of bleedout of a leachable substance, comprises an oil-resistant layer of a resin or a rubber, and it is preferred that the solubility parameter, SP, of the resin or rubber constituting the oil-resistant layer and the solubility parameter, SPs, of the plasticizer contained in the foam member satisfy the requirement represented by the following formula:

$$2 \leq |SP - SPs|$$

Further, the magnetic field generating layer per se can be used as the bleedout preventive layer.

According to the present invention, when the above described electroconductive layer and the magnetic field generating layer are formed on the solid surface layer portion by a coating method, since substantially no infiltration of the coating into the foam member occurs, it becomes possible to form an electroconductive layer and a magnetic field generating layer each having high adhesiveness. Also in the case of the formation of the electroconductive layer and magnetic field generating layer in a tubular form, the adhesion of these tubes can be easily and strongly accomplished for the above-described reason, and it is possible to form a toner carrier having an even surface.

EXAMPLES

The present invention will now be described more fully with reference to the following examples, although it is not limited to these examples only.

Example 1

A shaft and a foam member of polyurethane foam were integrally molded through the use of polyurethane as a main starting material by reaction injection molding to form a toner carrier having an outer diameter of 20 mm and provided with a solid surface layer portion on the outer periphery thereof. The surface of the toner carrier after molding may have any roughness depending upon the surface state of the mold. A sufficiently smooth surface having a surface roughness of 5 μm or less could be obtained by polishing the mold, and it was unnecessary to conduct post-working such as polishing of the outer shape of the toner carrier. The weight of the toner carrier except for the shaft could be reduced to 25 g when the toner carrier had a length of 230 mm and an outer diameter of 60 mm. When this toner carrier was pressed against a latent image carrier having an outer diameter of 60 mm by a pressure of 2 g/mm, the developing nip width (contact width) was about 2 mm. Thus, a developing device capable of maintaining a soft and stable pressure contact state could be prepared. This developing device was used for an image forming apparatus as shown in FIG. 1, and a line image of 300 DPI, a character image and a solid image were continuously formed on 10,000 sheets of recording paper. As a result, the 300 DPI-image was stably obtained without suffering from thickening of the line image, and a solid image having an excellent area gradation and a high density of 1.4 or more in terms of the OD value could be stably formed. Further, neither unfavorable phenomena such as fixation and fusing on the latent image carrier or toner carrier nor damage to the toner was observed. In the formation of an image, a developing bias voltage was applied to the blade, and deelectrification was conducted after the development.

Example 2

A shaft and a foam member of a silicone rubber foam were integrally molded by reaction injection molding through the use of an electrifying-agent-containing silicone rubber as a main starting material to form a toner carrier having an outer diameter of 20 mm and provided with a solid surface layer portion on the outer periphery thereof. The surface of the toner carrier after molding had ample smoothness, and it was unnecessary to conduct post-working such as polishing of the outer shape of the toner carrier. The resistance between the surface of the toner carrier and the shaft was of the order of several MΩ, that is, a suitable electric conductivity, could be obtained, and development could be conducted with a developing bias voltage applied to the shaft. When this toner carrier was pressed against a latent image carrier having an outer diameter of 60 mm with a pressure of 2 g/mm, the developing nip width (contact width) was about 2 mm. Thus, a developing device capable of maintaining a soft and stable pressure contact state was obtained. This developing device was used for an image forming apparatus as shown in FIG. 1, and a line image of 600 DPI, a character image and a solid image were continuously formed on 10,000 sheets of recording paper. As a result, the 600 DPI line image was stably obtained without a significant edge effect and thickening of the line image, and a solid image having a good dot recording reproducibility, an excellent area gradation and a high density of 1.4 or more in terms of the OD value was stably formed. Further, neither unfavorable phenomena such as fixation and fusing on the latent image carrier or toner carrier nor damage to the toner was observed. In this example, an electroconductive fine particle of carbon black or the like was used as the electrifying agent, and a toner carrier having an arbitrary resistance could be formed by varying the carbon black content.

Example 3

A shaft and a foam member of a polyurethane foam were integrally molded by reaction injection molding through the use of polyurethane as a main starting material, and an electroconductive coating comprising carbon black dispersed in polyurethane as a binder was spray-coated on a solid surface layer portion as a surface layer to form a coating having a thickness of about 50 μm, thereby forming an electroconductive toner carrier having an outer diameter of 20 mm. The surface of the toner carrier after molding had ample smoothness, and it was unnecessary to conduct post-working such as polishing of the outer shape of the toner carrier. Sufficient flexibility and compression se could be obtained even when the toner carrier was pressed against a latent image carrier having an outer diameter of 30 mm. Further, the surface resistance of the toner carrier was 1 MΩ or less, that is, a suitable electric conductivity could be obtained, and development could be conducted with a developing bias voltage applied to the shaft. When this toner carrier was pressed against a latent image carrier having an outer diameter of 30 mm with a pressure of 3 g/mm, the developing nip width (contact width) was about 2 mm. Thus, a developing device capable of maintaining a soft and stable pressure contact state was obtained. This developing device was used for an image forming apparatus as shown in FIG. 2, and a line image of 600 DPI, a character image and a solid image were continuously formed on 1,000 sheets of recording paper. As a result, the 600 DPI line image having a high resolution was stably obtained without a significant edge effect and without thickening of the line image, and a solid image having a good dot recording reproducibility, an excellent area gradation and a high density of 1.4 or more in terms of the OD value was stably formed. Further, neither unfavorable phenomena such as fixation and fusing on the latent image carrier or toner carrier nor damage to the toner was observed.

Example 4

A shaft and a foam member of a polyurethane foam were integrally molded by reaction injection molding through the use of polyurethane as a main starting material, and an electroconductive coating comprising carbon black dispersed in polyurethane as a binder was spray-coated on a solid surface layer portion as a surface layer to form an about 50 μm-thick electroconductive layer. Further, the electroconductive layer was coated with a fluororesin to form an about 1 μm-thick protective layer, thereby forming an electroconductive toner carrier having an outer diameter of 20 mm. The surface of the toner carrier after molding had ample smoothness, and it was unnecessary to conduct post-working such as polishing of the outer shape of the toner carrier. Ample flexibility and compression set was obtained even when the toner carrier was pressed against a latent image carrier having an outer diameter of 30 mm. When this toner carrier was pressed against a latent image carrier having an outer diameter of 30 mm with a pressure of 3 g/mm, the developing nip width (contact width) was about 2 mm. Thus, a developing device capable of maintaining a soft and stable pressure contact state was obtained. This developing device was used for an image forming apparatus as shown in FIG. 2, and a line image of 600 DPI, a character image and a solid image were continuously formed on 2,000 sheets of recording paper. As a result, the 600 DPI line image having a high resolution was stably obtained without a significant edge effect and without thickening of the line image, and a solid image having a good dot recording reproducibility, an excellent area gradation and a high density of 1.4 or more in terms of the OD value was stably formed. Further, neither unfavorable phenomena such as fixation and fusing on the latent image carrier or toner carrier nor damage to the toner was observed. The durability of the toner carrier was improved by the provision of a protective layer.

Example 5

A shaft and a foam member of a polyurethane foam were integrally molded by reaction injection molding through the use of polyurethane as a main starting material, and a magnetic electroconductive coating comprising $\gamma$-$Fe_2O_3$ and carbon black dispersed in polyurethane as a binder was roller-coated on a solid surface layer portion as a surface layer to form a coating having a thickness of about 10 μm, thereby forming a toner carrier having an outer diameter of 20 mm and provided with a magnetic field generating layer. The surface of the toner carrier after molding had ample smoothness, and it was unnecessary to conduct post-working such as polishing of the outer shape of the toner carrier. The above-described toner carrier having a magnetic field generating layer was subjected to line magnetization with a magnetization reversing pitch of 50 μm in a very fine pitch, and a thin layer of a toner comprising a magnetic toner (toner layer thickness: about 20 μm) could be held on the surface of the toner carrier by magnetic force. Further, sufficient flexibility and compression set could be obtained even when the toner carrier was pressed against a latent image carrier having an outer diameter of 30 mm. Further, the surface resistance of the toner carrier was 1 MΩ or less, that is, a suitable electric conductivity was obtained, and development was conducted with a developing bias voltage applied to the shaft. When this toner carrier was pressed against a latent image carrier having an outer diameter of 60 mm by a pressure of 2 g/mm, the developing nip width (contact width) was about 2 mm. Thus, a developing device capable of maintaining a soft and stable pressure contact state was obtained. This developing device was used for an image forming apparatus as shown in FIG. 3, and a line image of a character image and a solid image were continuously formed on 10,000 sheets of recording paper. As a result, a 600 DPI line image having a high resolution was stably obtained without a significant edge effect and without thickening of the line image. Thus a solid image having neither tailing nor fogging in the end of the image and having a good dot recording reproducibility, an excellent area gradation and a high density of 1.4 or more in terms of the OD value was stably formed. Further, no fogging occurred on the latent image carrier, not to mention on the recording paper, so that the amount of a waste toner was remarkably reduced. Thus, a reduction in the fogging by virtue of magnetic restraint was confirmed. Further, neither unfavorable phenomena such as fixation and fusing on the latent image carrier or toner carrier nor damage to the toner was observed.

Example 6

A shaft and a foam member of a polyurethane foam were integrally molded by reaction injection molding through the use of polyurethane as a main starting material, and a magnetic electroconductive coating comprising $\gamma$-$Fe_2O_3$ and carbon black dispersed in polyurethane as a binder was roller-coated on a solid surface layer portion as a surface layer to form a 10 μm-magnetic field generating layer. Further, a fluororesin was coated on the magnetic field generating layer to form a 1 μm-thick protective layer, thereby forming a toner carrier having an outer diameter of 20 mm and provided with a magnetic field generating layer. The surface of the toner carrier after coating of the protective layer had ample smoothness, and it was unnecessary to conduct post-working such as polishing of the outer shape of the toner carrier. The above-described toner carrier having a magnetic field generating layer was subjected to magnetization with a very fine pitch, and a thin layer of a toner comprising a magnetic toner could be held on the surface of the toner carrier by magnetic force. Further, when this toner carrier was pressed against a latent image carrier having an outer diameter of 60 mm with a pressure of 2 g/mm, the developing nip width (contact width) was about 2 mm. Thus, a developing device capable of maintaining a soft and stable pressure contact state was obtained. This developing device was used for an image forming apparatus as shown in FIG. 3, and a line image of 600 DPI, a character image and a solid image were continuously formed on 20,000 sheets of recording paper. As a result, the 600 DPI line image having a high resolution was stably obtained without a significant edge effect and without thickening of the line image, and a solid image having neither tailing nor fogging in the end of the image and having a good dot recording reproducibility, an excellent area gradation and a high density of 1.4 or more in terms of the OD value was stably formed. Further, no fogging occurred on the latent image carrier, not to mention on the recording paper, so that the amount of a waste toner was remarkably reduced. Thus, a reduction in the fogging by virtue of magnetic restraint was confirmed. Further, neither unfavorable phenomena such as fixation and fusing on the latent image carrier or toner carrier nor damage to the toner was observed. Thus, the durability of the toner carrier was improved by providing a protective layer.

Example 7

A shaft and a foam member of a silicone rubber foam were integrally molded by reaction injection molding through the use of a silicone rubber containing an electrifying agent as a main starting material, and the solid surface layer portion was subjected to a treatment with a silane coupling agent to form an adhesive layer. A magnetic electroconductive coating comprising $\gamma$-$Fe_2O_3$ dispersed in a polyolefin as a binder was roller-coated on the solid surface layer portion as a surface layer to form an about 10 $\mu$m-magnetic field generating layer. Further, a fluororesin was coated on the magnetic field generating layer to form a 1 $\mu$m-thick protective layer, thereby forming a toner carrier having an outer diameter of 20 mm and provided with a magnetic field generating layer. The surface of the toner carrier after coating of the protective layer had ample smoothness, and it was unnecessary to conduct post-working such as polishing of the outer shape of the toner carrier. Further, the provision of an adhesive layer in an interface between the solid surface layer portion and the magnetic field generating layer contributed to an improvement in the adhesive strength between the magnetic field generating layer and the solid surface layer portion. The above-described toner carrier having a magnetic field generating layer was subjected to magnetization with a very fine pitch, and a thin layer of a toner comprising a magnetic toner could be held on the surface of the toner carrier by magnetic force. Further, when this toner carrier was pressed against a latent image carrier having an outer diameter of 60 mm with a pressure of 2 g/mm, the developing nip width (contact width) was about 2 mm. Thus, a developing device capable of maintaining a soft and stable pressure contact state was obtained. This developing device was used for an image forming apparatus as shown in FIG. 3, and a line image of 600 DPI, a character image and a solid image were continuously formed on 20,000 sheets of recording paper. As a result, the 600 DPI line image having a high resolution was stably obtained without a significant edge effect and without thickening of the line image, and a solid image having neither tailing nor fogging in the end of the image and having a good dot recording reproducibility, an excellent area gradation and a high density of 1.4 or more in terms of the OD value was stably formed. Further, no fogging occurred on the latent image carrier, not to mention on the recording paper, so that the amount of a waste toner was remarkably reduced. Thus, a reduction in the fogging by virtue of magnetic restraint was confirmed. Further, neither unfavorable phenomena such as fixation and fusing on the latent image carrier or toner carrier nor damage to the toner was observed. Thus, the durability of the toner carrier was improved by providing a protective layer.

Comparative Example 1

A shaft and a foam member of a silicone rubber foam were integrally molded by reaction injection molding through the use of an electrifying-agent-containing silicone rubber as a main starting material to form an electroconductive toner carrier having an outer diameter of 20 mm. It was necessary to conduct post-working such as polishing of the outer shape of the toner carrier for the purpose of removing unnecessary portions, such as parting lines, to attain a high outer shape precision. The weight of the toner carrier except for the shaft could not be reduced and was 75 g when the toner carrier had a length of 230 mm and an outer diameter of 60 mm. When this toner carrier was pressed against a latent image carrier having an outer diameter of 60 mm by a pressure of 2 g/mm, substantially no developing nip width (contact width) could be obtained. In order to obtain a developing nip width (contact width) of about 1 mm, the toner carrier had to be pressed against the latent image carrier with a pressure of 20 g/mm or more. This made it necessary to increase the size of pressing mechanism components, and the application of the pressure caused the latent image carrier, toner carrier and toner to be damaged. The above-described developing device was used for an image forming apparatus as shown in FIG. 1, and a line image of 600 DPI, a character image and a solid image were continuously formed on 10,000 sheets of recording paper. As a result, the 600 DPI line image suffered from thickening of the line image, and only a solid image having severe fogging was obtained. When an image was formed on several tens of sheets, a flaw occurred on the latent image carrier and the toner fixed on the latent image carrier or the toner carrier, so that it was difficult to form a normal image.

The present invention is not limited to the above-described examples only but can be widely applied to developing devices such as electrophotography devices, particularly to printers, copying machines, facsimile machines and displays.

As described above, according to the present invention, a soft pressure contact development can be stably conducted through the use of a soft foam member, which makes possible formation of an image having a high resolution and less susceptible to a fluctuation in the density. Further, it is possible to provide a developing device which is suitable for pressure contact development and easy to manufacture, has a small size and a light weight and entails low cost.

In particular, when the toner carrier comprises a foam portion and a solid surface layer portion comprising an identical material continuous with each other and the solid surface layer portion is used as a toner holding surface, it becomes possible to prepare a toner carrier which requires no post-working and is inexpensive. Further, a soft pressure contact development becomes possible through the utilization of the softness of the foam portion and the flexibility of the solid surface layer portion, so that it is possible to provide a developing device which is less liable to give rise to damage to a toner and has high durability.

The provision of an electroconductive layer on the solid surface layer portion makes a development electrode proximate to the latent image carrier, which enables an image having a high resolution to be formed without a significant edge effect.

The provision of a magnetic field generating layer on the solid surface layer portion enables the toner to be restrained on the toner carrier, so that the toner can be stably transferred and fogging can be prevented by virtue of magnetic force. This contributes to a reduction in the amount of waste toner.

When the toner carrier is in the form of a roller and a solid surface layer portion is formed at least on the outer periphery of the foam member, it is possible to obtain an outer shape face which requires no polishing of the outer shape and makes it possible to easily form functional layers, such as an electroconductive layer and a magnetic field generating layer, on the solid surface layer portion.

The provision of a solid surface layer portion in a portion to be fixed to a shaft contributes to an improvement in the fixing strength between the shaft and the foam member.

When the thickness of the solid surface layer portion is 2 mm or less, it is possible to obtain ample flexibility for pressure contact development.

When the foam member comprises a soft foam, ample pressure contact width can be obtained, by which the development density can be stabilized through a reduction in the variation of the pressure contact state of the pressure contact portion.

What is claimed is:

1. A developing device having a toner carrier for feeding a toner through pressure contact with a latent image carrier on which an electrostatic latent image pattern has been formed,
   wherein said toner carrier comprises a foam member having a foam portion and a solid surface layer portion, said foam portion and said solid surface layer portion comprising an identical material and being continuous with each other substantially without the presence of any interface therebetween, said foam member having a thickness and a density gradient in the direction of the thickness such that said foam member has a cross section which exhibits an S-shaped or U-shaped density gradient curve.

2. A developing device according to claim 1, which further comprises an electroconductive layer on the surface of said solid surface layer portion.

3. A developing device according to claim 1, which further comprises a magnetic field generating layer on the surface of said solid surface layer portion.

4. A developing device according to claim 1, wherein said toner carrier is in the form of a roller and said solid surface layer portion is formed at least on the outer periphery of said foam member.

5. A developing device according to claim 4, wherein said foam member is fixed around a shaft and said solid surface layer portion is formed also in a portion to be fixed to said shaft.

6. A developing device according to claim 1, wherein the thickness of said solid surface layer portion is 2 mm or less.

7. A developing device according to claim 1, wherein said foam member comprises a soft foam selected from the group consisting of a polyurethane foam, a polystyrene foam, a polyethylene foam, an elastomer foam and a rubber foam.

8. A developing device according to claim 1, wherein the hardness of said toner carrier is in the range of from 10° to 70°.

9. A developing device according to claim 1, wherein the compression permanent strain of said foam member is 20% or less as determined according to JIS-K-6301.

10. A developing device according to claim 1, wherein the thickness ratio of the solid surface layer portion to the foam portion is in the range of from 0.02 to 0.5.

* * * * *